Patented Aug. 2, 1938

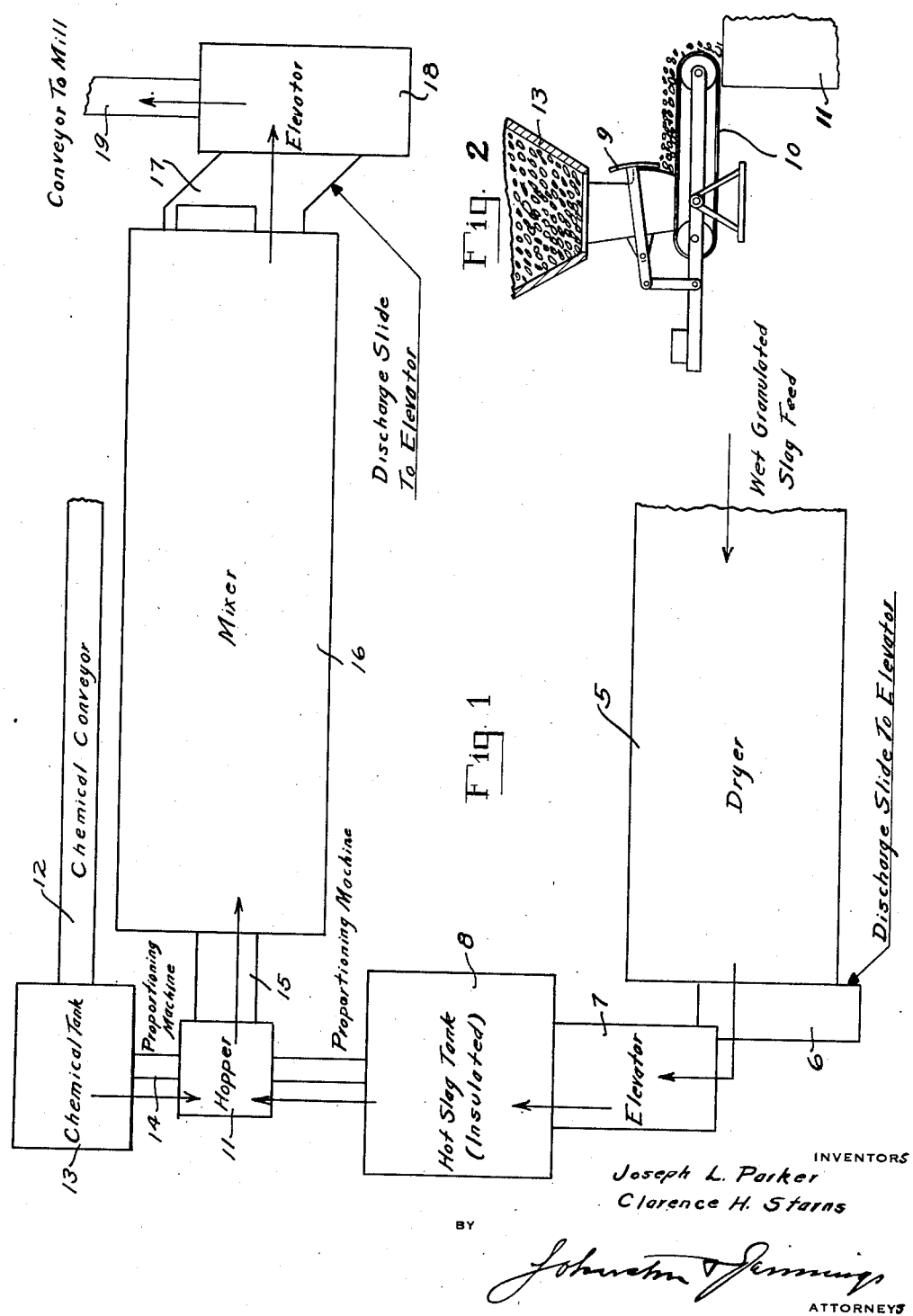

2,125,520

UNITED STATES PATENT OFFICE 2,125,520

PROCESS FOR MANUFACTURING CEMENTITIOUS SUBSTANCE FROM BLAST FURNACE SLAG

Joseph L. Parker and Clarence H. Starns, Birmingham, Ala., assignors to Southern Cement Company, a corporation of Alabama Application April 19, 1937, Serial No. 137,759

14 Claims. (Cl. 106—25.5)

Our invention relates to the treatment of hydraulic cements and cementitious substances of the character heretofore manufactured from blast furnace slag, puzzolan and the like, whereby such cementitious substances retain in full their non-staining characteristics and are improved both in respect of their set and strength, either or both, so that they will more favorably compare with Portland cement and become available for many uses for which they have hitherto been unsuitable because of their slower setting and lower breaking strength characteristics.

Blast furnace slag cement or puzzolan cement (or any cementitious substance having as its base said cements or either of them), when sulphur compounds of heavy metals and ammonium compounds have been suitably incorporated therein and caused to react thereon, acquire a materially increased hydrating action which will quicken the set and increase the seven and twenty-eight day strength of such material.

The chief object of our invention is concerned with a novel, practical and economic manner of reacting the sulphur compounds of heavy metals and the salts of ammonia on the granular slag to bring about the chemical changes in the resulting cementitious substance that will impart to it the new and improved properties above referred to, without adversely affecting its non-staining characteristic.

In the practice of our process we do not attempt the treatment of the slag while in molten or highly heated condition because of the impracticability of bringing about the desired reactions with the slag at such high temperatures, so we take the slag in granulated form preferably after it has been passed, in accordance with the prevailing practice, through a drier but the granular slag may have the reagents added before or during the drying step. We prefer to carry out the reactions with the dried slag, however, as thereby we avoid the presence of a variable volume of water in the mixture. With the dry, hot, granulated slag thus obtained, which has a temperature in the range of from 300° to 700° F. with an optimum temperature of 500° F., we commingle, in suitable proportions and in dry state, the selected chemical reagents and pass the hot slag in the presence of these reagents through a mixer wherein, under agitation and in the presence of residual heat, the desired reaction is brought about substantially uniformly throughout the mass of granulated slag, and the product thus treated is then rough ground, mixed with hydrated lime and passed to the finishing grinding mills for reduction in the usual manner to finished cementitious substance.

In the accompanying drawing we have illustrated a suitable apparatus for the practice of our process.

Fig. 1 shows a flow sheet; and

Fig. 2 a vertical sectional view of the chemical hopper with a typical proportioning valve to regulate the volumetric discharge of dry chemicals into the mixing hopper.

Our process, as illustrated in the flow sheet, calls for the wet granulated slag to be delivered to a typical drier 5 in passing through which it is heated and discharged in a dry hot state, usually at a temperature around 500° F., into a discharge chute 6 whence it passes to a suitable elevator 7 by which it is delivered into the hot slag tank 8. From this tank, by means of a proportioning valve, such as 9 in Fig. 2, the slag is carried off on a belt such as 10 and delivered into the mixing hopper 11. The chemical reagent in dry state, is fed by a belt conveyor 12 to a chemical tank 13 whence it is discharged, under the control of a proportioning valve 9 onto a feed belt 10 and passed through chute 14 into the mixing hopper 11. The proportioned volumes of hot granulated slag and dry chemical reagent or reagents are then delivered by a chute or conveyor 15 into a rotary or other suitable mixer 16 through which the commingled mass passes under such agitation as will bring about a thorough and uniform commingling of all constituents and allow sufficient time for the contemplated reactions to occur. The treated slag discharged from the mixer passes down a slide 17 into an elevator 18 whence it is delivered to a conveyor 19 and after the hydrated lime additions are made, it passes to the grinding mill.

In the present practice in the manufacture of ordinary blast furnace slag cement, it is customary to discharge the dried granulated slag from the drier 5 after being cooled directly into the elevator 18, but according to our process if the slag be taken with no more heat than was supplied in the drier, it can be treated without expense other than that incidental to the supply, and proper incorporation of the selected chemical reagents therein, and materially beneficiated so that the resulting finished cement will have the improved properties above pointed out.

The preferred sulphur compound of heavy metals is sulphate of iron in the form of ferric sulphate $Fe_2(SO_4)_3$, but the sulphur compounds of other heavy metals may be used, such as the sulphur salts of copper, lead, aluminum, tin, zinc, nickel and cobalt. The proportion of this sulphur compound is within the range of .2% to 1.% based on weight of the slag, preferably .6%, as percentages in excess of this range may result in some discoloration of the finished cement. If this ferric sulphate or any of the other sulphur compounds mentioned were mixed with the slag in molten or white hot condition, that is to say at a temperature range considerably above 900° C., it would decompose before it could properly combine with the slag, the sulphur going off in the form of sulphur di-oxide or sulphur tri-oxide, leaving only the iron oxide present which would discolor the cement without beneficiating it. But by treating the granulated slag at temperatures within the range of 300° to 700° F., preferably at 500° F., the objectionable decomposition and oxidation results above pointed out are avoided.

The ammonium salt preferred is ammonium sulphate $(NH_4)_2SO_4$, but other ammonium salts such as ammonium sulphite, ammonium sulphide, ammonium carbonate, ammonium chloride, ammonium phosphates, ammonium chlorate, ammonium nitrate, ammonium acetate, and ammonium hydroxide may be used within the range of .1% to .8%, with the optimum proportion .25% based on weight of the slag. Any material excess of the ammonium salt will give an objectionable excess of ammonia in the finished cement, and if the ammonium salt were subjected to the high temperatures that would exist if used in the treatment of molten slag, it would at once decompose and be driven off so that it could not properly combine with the slag and beneficiate the finished cementitious substance. The ammonium compounds above suggested are not caustic in their nature and are not classed as alkalies which would tend to increase the soluble alkali present in the finished cement and therefore render it objectionable where non-staining cement is required, because staining is a result of the reaction of soluble alkalies in the cement with organic material found in limestone.

The chemical reagents selected are used in dry state to avoid a second drying operation for the treated slag before it passes to the tube ball grinding mills.

While the reactions occurring in the granulated slag are very complex and difficult of accurate determination, it may be said that the effect of the use of a sulphur compound of a heavy metal on the finished cement increases its strength. If, however, a quicker setting characteristic also is desired, the ammonium salt is added.

It will be understood that variations in the composition of the slag may call for minor variations in the amount of the reagents used, but for blast furnace slags such as prevail in the Birmingham district, the optimum proportions of the sulphur and ammonium compounds above specified have given excellent results. These slags as an average, contain $SiO_2$, 36–40%; $R_2O_3$, 12 to 14%; MgO, 1 to 3%; and, CaO 43 to 47%. It will be further understood that my process is applicable to blast furnace slag or to any puzzolanic cementitious materials, whether natural or artificial, and that the terms "puzzolan" and "puzzolanic stock", are used herein in their broader sense to indicate hydraulic cementitious materials containing soluble silicic acid.

What we claim is:—

1. The process for improving the strength of puzzolanic cementitious substances, which comprises reacting cementitious puzzolanic stock with a sulphur compound of a heavy metal within the temperature range of 300° to 700° F.

2. The process for improving the set and strength of slag and puzzolanic cementitious substances, which comprises reacting cementitious puzzolanic stock with a sulphur compound of a heavy metal and an ammonium compound within a reaction temperature range of 300° to 700° F.

3. The process for improving the set and strength of slag and puzzolanic cementitious substances, which comprises treating dried cementitious puzzolanic stock with a sulphur compound of a heavy metal and an ammonium compound, both being in a dry state, and carrying out the reaction within the temperature range of 300° to 700° F.

4. The process for improving the strength of puzzolanic cementitious substances, which comprises treating the granulated puzzolanic stock while heated within the range of 300° to 700° F. with a sulphur compound of a heavy metal selected from iron, copper, aluminum, lead, tin, zinc, nickel and cobalt.

5. The process for improving the set of puzzolanic cementitious substances, which comprises treating the granulated puzzolanic stock while heated within the range of 300° to 700° F., with an ammonium compound selected from ammonium sulphate, ammonium sulphite, ammonium sulphide, ammonium carbonate, ammonium chloride, ammonium phosphates, ammonium chlorate, ammonium nitrate, ammonium acetate, and ammonium hydroxide.

6. The process for improving the set and strength of puzzolanic cementitious substances, which comprises treating the granulated puzzolanic stock while heated within the range of 300° to 700° F. with a sulphur compound of a heavy metal and an ammonium compound in a dry state and under agitation until the reaction is substantially complete.

7. The process for the production of cementitious substances from blast furnace slag, which comprises reducing the slag to a wet granular state, drying the granular slag, reacting the hot dried slag within the temperature range of 300° to 700° F. with approximately .6% of its weight of a sulphur compound of a heavy metal in a dry state, and agitating the commingled mass until the reaction is substantially complete, adding hydrated lime, and grinding the treated slag and lime to the form of a finished cementitious substance.

8. The process for the production of cementitious substances from blast furnace slag, which comprises drying granulated slag, reacting with the slag while at a temperature approximating 500° F. with from .2 to 1.% of its weight of ferric sulphate, adding hydrated lime, and grinding to finished cementitious form.

9. The process for the production of cementitious substances from blast furnace slag, which comprises drying granulated slag, reacting the dried slag while at a temperature approximating 500° F. with from .1 to .8% of its weight of ammonium sulphate, adding hydrated lime, and grinding to finished cementitious form.

10. The process for the production of cementitious substances from blast furnace slag, which comprises reacting with granulated slag while in the temperature range of 300° to 700° F. with approximately .6% of its weight of ferric sulphate, and .25% of its weight of ammonium sulphate, adding hydrated lime, and grinding the mass after the reaction is substantially complete to finished cementitious form.

11. The step in the process of manufacturing cementitious substances from blast furnace slag, which comprises reacting the hot granular slag within the temperature range of 300° to 700° F. with an inorganic ammonium salt.

12. The step in the process of manufacturing cementitious substances from blast furnace slag, which comprises reacting the granular slag within the temperature range of 300° to 700° F. with an inorganic ammonium salt in an amount approximating .25% based on the weight of the slag.

13. The step in the process of manufacturing blast furnace slag cement, which comprises reacting within the temperature range of 300° to 700° F. granular slag with an inorganic ammonium salt in amount of approximately .25% by weight of slag and with a sulphur compound of a heavy metal in amount of approximately .6% by weight of slag.

14. The step in the process of manufacturing cement from blast furnace slag and the like, which comprises mixing in a dry state with the dried granulated slag at a temperature ranging from 300° to 700° F. .25% by weight of ammonium sulphate, and ferric sulphate up to the capacity of the granular material to combine therewith without objectionable discoloration of the resulting cement.

JOSEPH L. PARKER.
CLARENCE H. STARNS.